US011681873B2

(12) United States Patent
Inagaki et al.

(10) Patent No.: US 11,681,873 B2
(45) Date of Patent: Jun. 20, 2023

(54) CREATING AN EXECUTABLE PROCESS FROM A TEXT DESCRIPTION WRITTEN IN A NATURAL LANGUAGE

(71) Applicant: International Business Machines Corporation, Armonk, NY (US)

(72) Inventors: Takeshi Inagaki, Sagamihara (JP); Aya Minami, Koto (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 16/567,231

(22) Filed: Sep. 11, 2019

(65) Prior Publication Data

US 2021/0073330 A1  Mar. 11, 2021

(51) Int. Cl.
*G06F 40/295* (2020.01)
*G06F 16/93* (2019.01)
*G06F 40/242* (2020.01)
*G06N 20/00* (2019.01)

(52) U.S. Cl.
CPC ............ *G06F 40/295* (2020.01); *G06F 16/93* (2019.01); *G06F 40/242* (2020.01); *G06N 20/00* (2019.01)

(58) Field of Classification Search
CPC .......... G06K 9/627; G06K 1/00; G06N 20/00; G06N 7/005
USPC .................................................... 704/275, 48
See application file for complete search history.

(56) References Cited

U.S. PATENT DOCUMENTS

| 5,867,649 A * | 2/1999 | Larson .................... G06F 8/314 |
| | | 709/201 |
| 10,255,269 B2 * | 4/2019 | Quirk ..................... G06F 40/00 |
| 10,467,221 B2 * | 11/2019 | Chen ....................... G06F 16/93 |
| 10,606,586 B2 * | 3/2020 | Majumdar ............... G06F 8/20 |
| 10,664,246 B2 * | 5/2020 | Hoover .................... G06F 8/36 |
| 2003/0066050 A1 | 4/2003 | Wang et al. |
| 2004/0090439 A1 * | 5/2004 | Dillner .............. G06K 9/00402 |
| | | 345/440 |
| 2006/0288285 A1 * | 12/2006 | Lai ........................ G06F 40/226 |
| | | 715/708 |
| 2007/0083359 A1 * | 4/2007 | Bender .................. G06F 40/58 |
| | | 704/9 |

(Continued)

FOREIGN PATENT DOCUMENTS

| CN | 106250159 A | 12/2016 |
| CN | 106910001 A | 6/2017 |

(Continued)

OTHER PUBLICATIONS

International Search Report and Written Opinion, PCT/IB2020/058135, dated Dec. 17, 2020, 9 pages.

*Primary Examiner* — Akwasi M Sarpong
(74) *Attorney, Agent, or Firm* — Nathan M. Rau

(57) ABSTRACT

Methods, apparatus, and products for creating an executable process from a text description written in a natural language in accordance with the present invention are described. A set of propositions is extracted from a text document written in a natural language. Based on the set extracted of propositions, a set of formulas is extracted from the text document. A state transition graph comprising a set of proposition value determination paths constrained by the set of formulas is then created. The state transition graph is translated into a software application.

20 Claims, 8 Drawing Sheets

(56) References Cited

U.S. PATENT DOCUMENTS

| | | | | |
|---|---|---|---|---|
| 2008/0312890 A1* | 12/2008 | Zhu | G06F 8/10 | 703/6 |
| 2011/0161926 A1* | 6/2011 | Cruise | G06F 8/35 | 717/113 |
| 2012/0078918 A1* | 3/2012 | Somasundaran | G06F 40/295 | 707/748 |
| 2012/0210296 A1 | 8/2012 | Boulter et al. | | |
| 2014/0079297 A1* | 3/2014 | Tadayon | G06K 9/00288 | 382/118 |
| 2014/0195897 A1* | 7/2014 | Balinsky | G06F 40/106 | 715/254 |
| 2014/0310235 A1* | 10/2014 | Chan | G06F 11/079 | 707/603 |
| 2015/0006501 A1* | 1/2015 | Talmon | G06F 16/9024 | 707/708 |
| 2015/0019461 A1* | 1/2015 | Simard | G06N 7/005 | 706/11 |
| 2015/0162006 A1* | 6/2015 | Kummer | H04N 21/478 | 704/275 |
| 2015/0363391 A1 | 12/2015 | Mungi et al. | | |
| 2017/0003937 A1* | 1/2017 | Huebra | G06F 8/73 | |
| 2018/0189269 A1* | 7/2018 | Quirk | G06F 40/295 | |
| 2019/0005163 A1* | 1/2019 | Farrell | G06F 40/30 | |
| 2019/0057157 A1* | 2/2019 | Mandal | G06F 16/9535 | |
| 2020/0135180 A1* | 4/2020 | Mukherjee | G10L 15/1815 | |
| 2020/0184278 A1* | 6/2020 | Zadeh | G06F 16/953 | |
| 2021/0174937 A1* | 6/2021 | Swisher | G06K 9/6232 | |

FOREIGN PATENT DOCUMENTS

| | | |
|---|---|---|
| CN | 109634578 A | 4/2019 |
| WO | WO-2019/029723 A1 | 2/2019 |

* cited by examiner

CREATING AN EXECUTABLE PROCESS FROM A TEXT DESCRIPTION WRITTEN IN A NATURAL LANGUAGE

BACKGROUND

Field of the Invention

The field of the invention is data processing, or, more specifically, methods, apparatus, and products for creating an executable process from a text description written in a natural language.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer are increasingly used to automate tasks. However, certain tasks rely on documents written in a natural language, and thus require human intervention. For example, when chatting with an assistant during an online help session, the assistant may be able to reference a help manual or troubleshooting specification. As another example, when calling an insurance agent regarding insurance coverage, the agent may have policy documents to reference in order to answer questions about coverage. To automate these tasks with computer-implemented artificial intelligence (AI), it may be difficult and time consuming to convert the natural language documents into computer code that can be understood by the AI.

SUMMARY

An embodiment in accordance with the present invention is directed a method of creating an executable process from a text description, comprising extracting a set of propositions from a text document written in a natural language, extracting, in dependence upon the set of propositions, a set of formulas from the text document, creating a state transition graph comprising a set of proposition value determination paths constrained by the set of formulas, and translating the state transition graph into a software application.

Another embodiment in accordance with the present invention is directed to an apparatus for creating an executable process from a text description written in a natural language, the apparatus comprising a computer processor, a computer memory operatively coupled to the computer processor, the computer memory having disposed within it computer program instructions that, when executed by the computer processor, cause the apparatus to carry out the steps of extracting a set of propositions from a text document written in a natural language, extracting, in dependence upon the set of propositions, a set of formulas from the text document, creating a state transition graph comprising a set of proposition value determination paths constrained by the set of formulas, and translating the state transition graph into a software application.

Yet another embodiment in accordance with the present invention is directed to a computer program product for creating an executable process from a text description written in a natural language, the computer program product disposed upon a computer readable medium, the computer program product comprising computer program instructions that, when executed, cause a computer to carry out the steps of extracting a set of propositions from a text document written in a natural language, extracting, in dependence upon the set of propositions, a set of formulas from the text document, creating a state transition graph comprising a set of proposition value determination paths constrained by the set of formulas, and translating the state transition graph into a software application.

In various embodiments in accordance with the present invention, extracting a set of propositions from the text document may include masking, in each sentence of the text document, keywords listed in a predefined dictionary, masking, in each sentence of the text document, character sequence patterns represented by predefined expression rules, and mapping, by a machine learning process, the masked portions of each sentence to a proposition class.

In various embodiments in accordance with the present invention, extracting, in dependence upon the set of propositions, a set of formulas from the text document may include extracting relations among the set of propositions, and generating a set of logical formulas representing the relations as conditional statements. In some embodiments, extracting, in dependence upon the set of propositions, a set of formulas from the text document may further includes extracting a relationship between a logical formula occurring in a first sentence of the text document to another logical formula occurring in a second sentence of the text document.

In various embodiments in accordance with the present invention, creating a state transition graph comprising a set of proposition value determination paths constrained by the set of formulas may include constructing, for each proposition in the set of propositions, a process flow tree representing all possible states a proposition value, applying the set of formulas as constraints to all paths in the process flow tree, and optimizing the process flow tree.

In various embodiments in accordance with the present invention, translating the state transition graph into a software application comprises generating computer-executable logic that determines values for proposition variables represented in the state transition graph.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
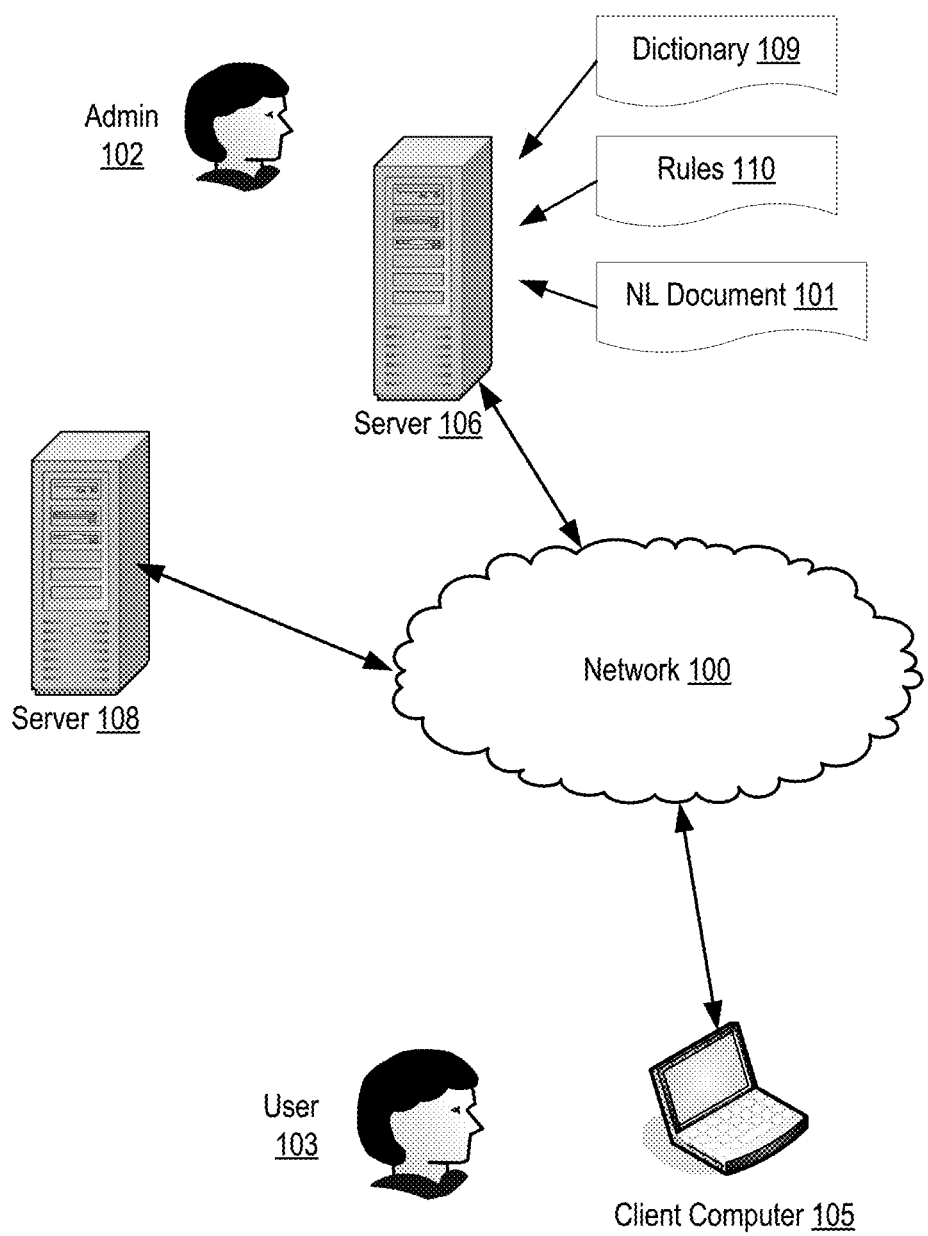
FIG. 1 is a diagram of an example network environment for creating an executable process from a text description written in a natural language in accordance with the present invention.

Exemplary methods, apparatus, and products for creating an executable process from a text description written in a natural language in accordance with the present invention are described with reference to the accompanying drawings, beginning with FIG. 1. FIG. 1 sets forth a network diagram of a system configured for creating an executable process from a text description written in a natural language according to embodiments of the present invention. The system of FIG. 1 includes a server (106) configured for natural language processing that receives a document (101) written in a natural language from an administrator (102) and creates the executable process from the received document. The server (106) also receives from the administrator (102) a dictionary (109) containing keywords that have a significant meaning in the document (101), as well as a set of pattern rules (110) useful in recognizing natural language patterns.

The server (106) extracts propositions and formulas from each sentence in the document (101). Extracting propositions includes masking significant keywords, identified by the listed words in a dictionary of keywords, and character sequence patterns represented by rules such as regular expression rules. Propositions are then extracted using machine learning to recognize the patterns of expression and label the proposition with a proposition class. Extracting formulas includes extracting relations among the extracted propositions by machine learning, and outputting a logical formula as a conditional statement among propositions.

Next, the server (106) creates proposition value determination paths under constraint of the extracted formulas. A tree flow diagram, represented as a state transition graph, is constructed to represent all possible states of each propositions' values. Paths in the tree flow diagram are branched according to a true or false value of a proposition. The extracted logical formulas are applied to all paths and paths that do not meet the conditions are invalidated. The remaining paths are optimized by removing duplicated paths that result in same end node regardless of values of proposition variables.

The server (106) then translates the state transition graph to an executable process such as a software application. The application provides a way to determine values of proposition variables one-by-one according to the state transition flow graph. For example, the values are determined by asking queries relevant for propositions to the user. A user will get a various sequence of questions depending on the answers provided.

After the executable process has been created by the server (106), an application program interface (API) on the server (106) or another server (108) in communication with the server (106) may provide an end user (103) with access to the executable process on the server (106) over a network (100). For example, a user interface (UI) on a client computer (105) may access the executable process through the API. In one exemplary use, the document (101) may be a help manual or maintenance manual and the executable process may be artificial intelligence (AI) software that can simulate a conversation (or a chat) with the user (103) in natural language through messaging applications, websites, mobile apps or through the telephone, referred to herein a "chatbot" application. In another exemplary use, the document (101) may be an insurance policy document and the executable process may be an automated claim assessment application that assists the user (103) in validating coverage of an insurance claim.

The network (100) may comprise one or more Local Area Networks (LANs), Wide Area Networks (WANs), Personal Area Networks, mesh networks, cellular networks, internets, intranets, or other networks and combinations thereof. The network (100) may comprise one or more wired connections, wireless connections, or combinations thereof. The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Creating an executable process from a text description written in a natural language in accordance with the present invention is generally implemented with computers, that is, with automated computing machinery. In the system of FIG. 1, for example, the server (106), the server (108) and the client computer (105) are all implemented, to some extent at least, as computers. For further explanation, therefore, FIG. 2 sets forth a block diagram of automated computing machinery comprising an exemplary computer (152) configured for creating an executable process from a text description written in a natural language according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a natural language processor (126), a module of computer program instructions for creating an executable process from a text description written in a natural language according to embodiments of the present invention. Also stored RAM (168) is a proposition natural language processing model (130), a module of computer program instructions useful for extracting propositions from natural language using machine learning. Also stored RAM (168) is a formula natural language processing model (131), a module of computer program instructions useful for extracting formulas, or logical relations among propositions, from natural language using machine learning. Also stored RAM (168) is a state transition graph generator (132), a module of computer program instructions for generating a state transition graph representing proposition determination paths as constrained by the formulas.

Figure 2:
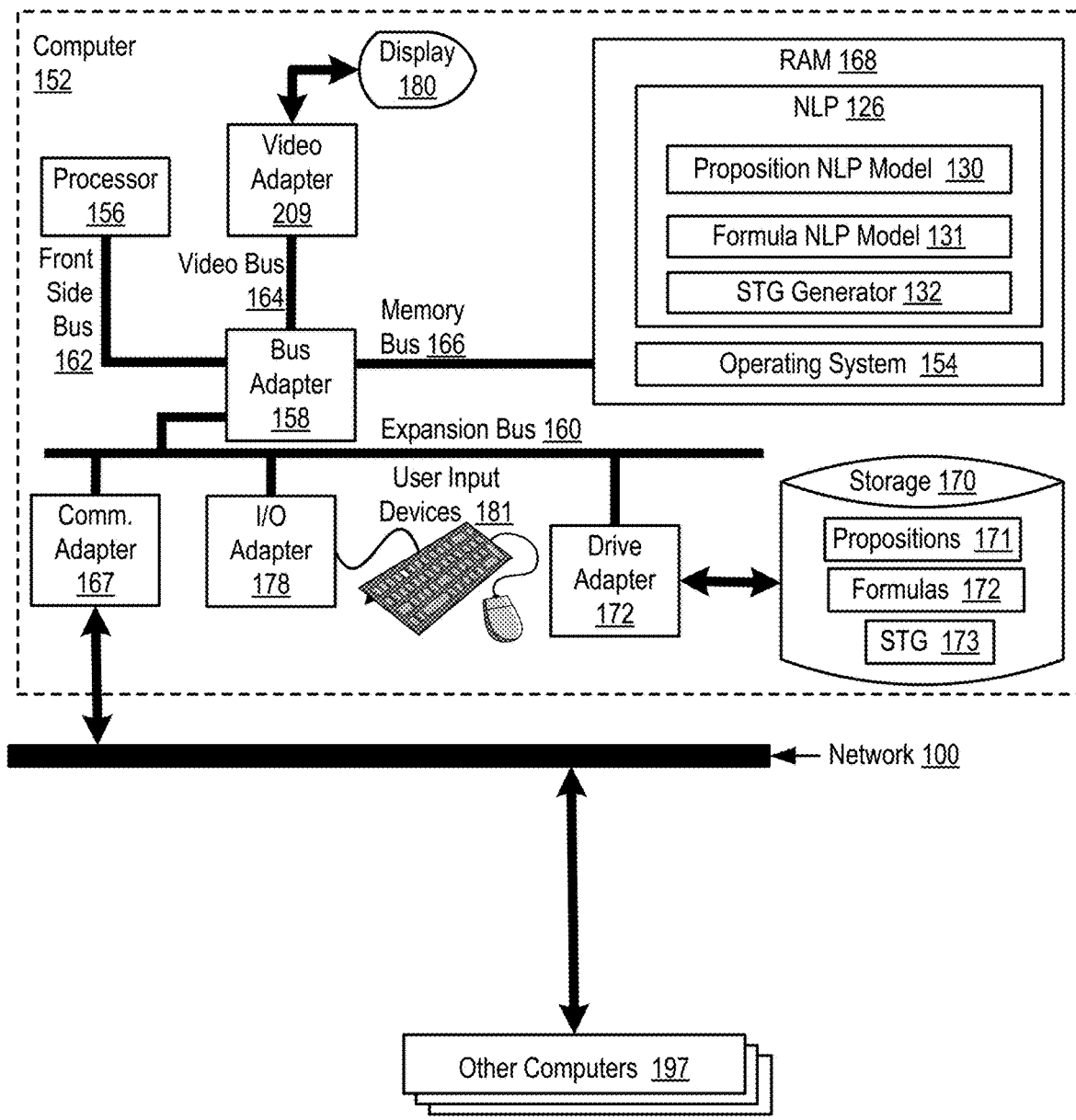
FIG. 2 is a block diagram of an example computer for creating an executable process from a text description written in a natural language in accordance with the present invention.

Also stored in RAM (168) is an operating system (154). Operating systems useful in computers configured for creating an executable process from a text description written in a natural language according to embodiments of the present invention include UNIX™, Linux™, Microsoft XP™, AIX™, IBM's i5/OS™, and others as will occur to those of skill in the art. The operating system (154), NLP (126), proposition NLP model (130), formula NLP model (131), and STG generator (132) in the example of FIG. 2 are shown in RAM (168), but many components of such software typically are stored in non-volatile memory also, such as, for example, on a hard drive storage device (170). The output of the NLP (126), i.e., propositions (171), formulas (172), and STG (173), may also be stored in non-volatile memory, such as, for example, on the hard drive (170).

The computer (152) of FIG. 2 includes hard drive adapter coupled through expansion bus (160) and bus adapter (158) to processor (156) and other components of the computer (152). Hard drive adapter connects non-volatile data storage to the computer (152) in the form of hard drive (170). Hard drive adapters useful in computers configured for creating an executable process from a text description written in a natural language according to embodiments of the present invention include Integrated Drive Electronics ('IDE') adapters, Small Computer System Interface ('SCSI') adapters, and others as will occur to those of skill in the art. Non-volatile computer memory also may be implemented for as an optical hard drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (197) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for creating an executable process from a text description written in a natural language according to embodiments of the present invention include modems for wired dial-up communications, Ethernet (IEEE 802.3) adapters for wired data communications, and 802.11 adapters for wireless data communications.

Figure 3:
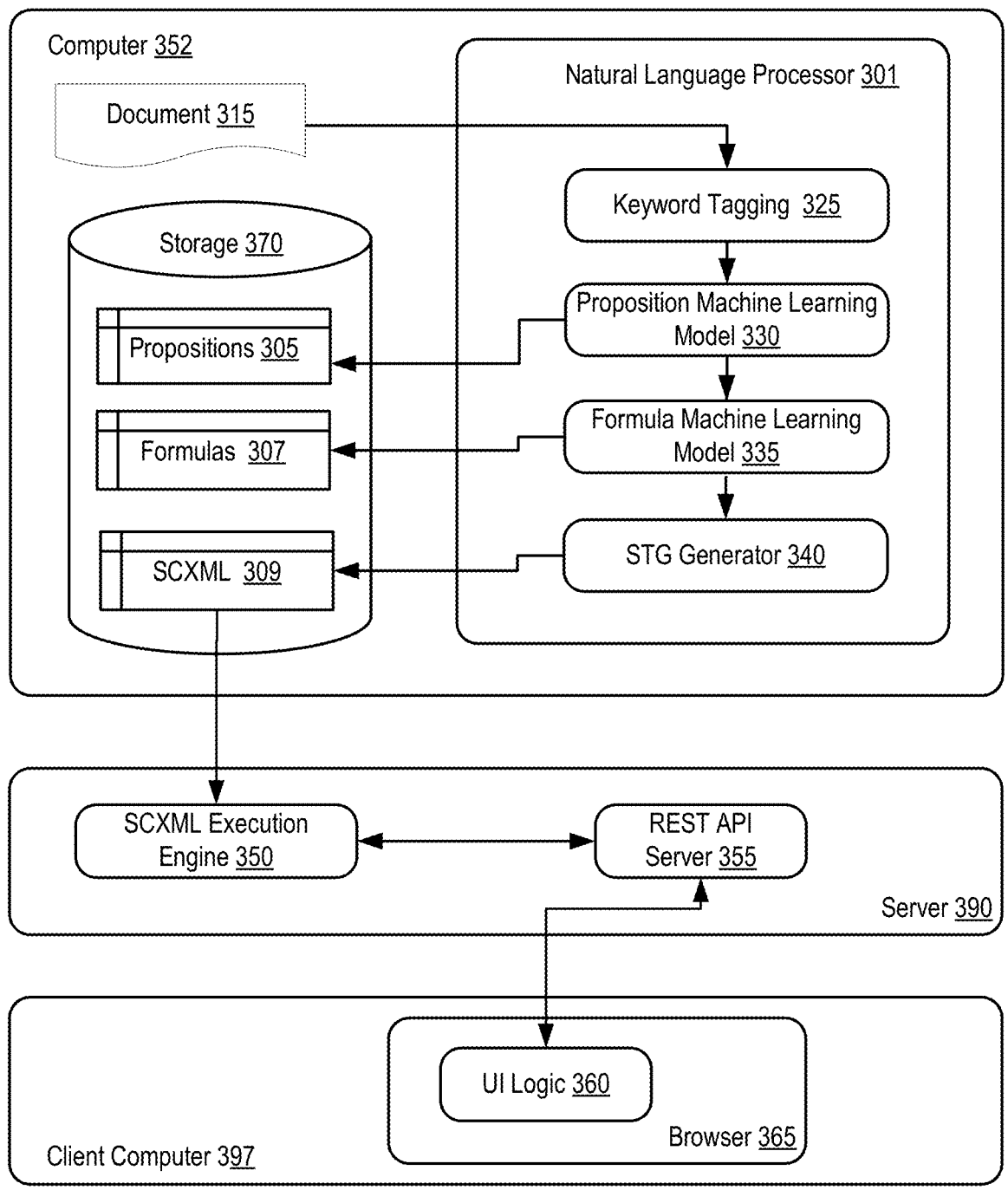
FIG. 3 is a block diagram of an example system for creating an executable process from a text description written in a natural language in accordance with the present invention.

For further explanation, FIG. 3 sets forth a system diagram for an exemplary system for creating an executable process from a text description written in a natural language according to embodiments of the present invention. The exemplary system shown in FIG. 3 may be configured for a "chatbot" application or other application in which a user's yes/no answers provide a basis for transition from one state to the next in the executable process.

In the system of FIG. 3, a computer system (352) includes a natural language processor (301), storage (370), and a text document (315), which may be a manual, specification, or other natural language document from which an executable process is to be created, as previously discussed. The natural language processor (301) includes a keyword tagging module (325) that accepts the text document (315) as an input. The keyword tagging module (325) identifies keywords from a keyword dictionary, as previously discussed, and substitutes the identified keywords with abstract tags. The natural language processor (301) further includes a proposition machine learning model (330) that accepts the keyword representations from the keyword tagging module (325) as an input and extracts propositions (305) from the natural language expressions of the document (325) based on proposition class definitions. The propositions (305) are stored in storage (370). The natural language processor (301) further includes a formula machine learning model (335) that accepts proposition class representations from the proposition machine learning model (330) and extracts formulas (307) representing conditional statements among proposition variables based on formula class definitions. The formulas (307) are stored in storage (370). The natural language processor (301) further includes an STG generator (340) accepts formula class representations from the formula machine learning model (335) and generates a state transition graph (309), which may be in the form of, for example, an SCXML file.

The system of FIG. 3 further includes a server (390) that may be implemented on the same machine as the computer (352), or on separate machines that communicate over a computer network. The server (390) includes an SCXML execution engine (350) that takes the SCXML file (309) as its input and parses the file to execute a process based on input given at each state. The server (390) further includes an API server (355), such as a REpresentational State Transfer (REST) API server, that generates questions and receives a user's to answers, which are then relayed to the SCXML execution engine (350) to determine a next state in the executable process. The API server (355) may communicate with UI logic (360) on a client device (397) to obtain answers provided by a user. For example, the UI logic (360) may be embedded in a browser (365) or other user interface application.

Figure 4:
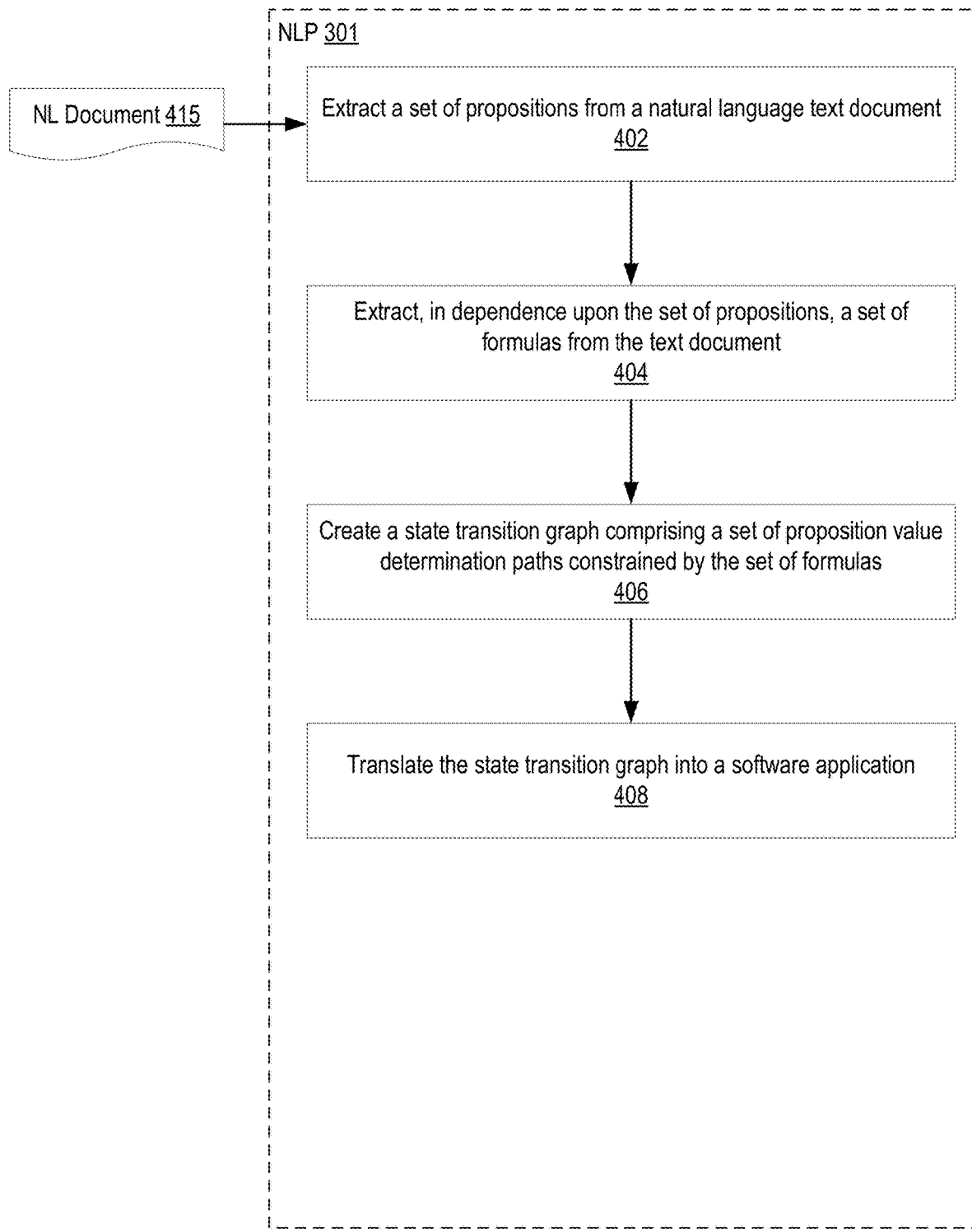
FIG. 4 is a flowchart of an example method for creating an executable process from a text description written in a natural language in accordance with the present invention.

For further explanation, FIG. 4 sets forth a flow chart illustrating an exemplary method for creating an executable process from a text description written in a natural language according to embodiments of the present invention. The method of FIG. 4 includes extracting (402) a set of propositions from a text document (415). A proposition, as used herein, is a Boolean variable that has a value of "true" or "false." A proposition includes entities represented by keywords. For example, "age of the insured person is less than 18 years old" is a proposition that has true or false value depending on the person applied to the proposition. The text document (415) is a natural language document from which the executable process is to be created. For example, the text document (415) may be a document such as insurance policy for an automated insurance claim processing application. In another example, the text document (415) is a maintenance or user manual for an automated help application such as a "chatbot."

Extracting (402) a set of propositions from a text document may be carried out by receiving the text document (415) from a user and detecting entities such as keywords and phrases using natural language processing (NLP) and machine learning techniques. Detecting entities such as keywords and phrases using NLP and machine learning techniques may be carried out, for example, by the proposition machine learning model (330) of FIG. 3. A set of keywords may be provided in a dictionary (425) supplied by the user to identify the keywords. The dictionary (425) includes keywords that have a significant meaning within the text document (415). Phrases may be detected based on a set of expression rules (435) useful in identifying natural language patterns. The expression rules (435) may also be supplied by the user. For each sentence in the text document (415), propositions are extracted by replacing identified keywords and phrases with abstract tags. A proposition class may be used to express the proposition using the abstract tags. By omitting actual representations (names) of entities, a proposition class describes generic property of entities. For example, a proposition class associated to the example above is T0_AGE_LESS_THAN_T1 where T0 and T1 are abstract tags for entities, and where T0 is "person" and T1 is "18 years". The proposition class becomes a proposition when actual entity keywords are supplied. Each proposition class may be defined and provided by the user.

The method of FIG. 4 also includes extracting (404), in dependence upon the set of propositions, a set of formulas from the text document. A formula, as used herein, represents a relation between values of multiple proposition variables. With formulas, each proposition variable does not have its value freely but is constrained by values of others. Each logical formula in the extracted set of formulas may include propositions variables, logical operators, and conditional statements. Extracting (404), in dependence upon the set of propositions, a set of formulas from the text document may be carried out by determining logical relationships between logical entities in a sentence of the text document using NLP and machine learning techniques. Determining logical relationships between logical entities in a sentence of the text document using NLP and machine learning techniques may be carried out by the formula machine learning model (335). For example, a conditional statement is written as A->B where A and B are proposition variables and the formula A->B constrains possible combinations of proposition variable values as "if A is true, B should be true." A formula class may be used to express formulas by replacing propositions with abstract tags. The formula class represents logical relations among propositions without specifying propositions. Thus, the abstract tags represent proposition variables. Each formula class may be defined and provided by the user.

The method of FIG. 4 also includes creating (406) a state transition graph comprising a set of proposition value determination paths constrained by the set of formulas. A state is an ordered combination of proposition values. A state transition graph represents all possible transitions from a state to other state by determining the value a variable. A node of the state transition graph represents a state and an edge represents a value of the variable corresponding to state transition between connected two nodes. Under the constraints of formulas, possible transitions are limited. This constrained transition graph is called state transition graph of a process. In other words, the state transition graph is a process flow branching by determination of values of propositions. One example of standard output format representing the state transition graph is State Chart eXtensible Markup Language (SCXML), which represents transitions among states by events. For example, in the use case of a chatbot application, a state represents a state of the conversation; in the use case of automated insurance claim assessment, a state represents a state of the validation progress.

Creating (406) a state transition graph comprising a set of proposition value determination paths constrained by the set of formulas may be carried out by constructing a tree flow diagram in which each a first proposition variable is a start node and a "true" edge and a "false" edge each connect to another related proposition variable, and each "true" edge and each "false" edge of the related proposition variables connect to still other proposition variables, and so on until a final node completing the process is reached for every path. Creating (406) a state transition graph comprising a set of proposition value determination paths constrained by the set of formulas includes validating an outcome determination for all states in each path.

Continuing the above example, consider the following set of formulas that have been extracted:
W0->W1
W0=T0_AGE_LESS_THAN_T1
W1=HAVE_T2
T0=person
T1=18 years
T2=clinical examination Now consider a third proposition variable W2 that depends on W0, such that the formula W2->0 is obtained. If there are three proposition variables (W0, W1, W2), the system has $2^3=8$ states, as follows: (0,0,0), (1,0,0), (0,1,0), (0,0,1), (1,1,0), (1,0,1), (0,1,1), (1,1,1).

Given a formula W2->W0, the following outcomes are derived, although two paths (2th and 4th) result with "Abnormal end" because W2 is true when W0 is false:
1. Start->(0)->(0,0)->(0,0,0)->Normal end
2. Start->(0)->(0,0)->(0,0,1)->Abnormal end
3. Start->(0)->(0,1)->(0,1,0)->Normal end
4. Start->(0)->(0,1)->(0,1,1)->Abnormal end
5. Start->(1)->(1,0)->(1,0,0)->Normal end
6. Start->(1)->(1,0)->(1,0,1)->Normal end
7. Start->(1)->(1,1)->(1,1,0)->Normal end
8. Start->(1)->(1,1)->(1,1,1)->Normal end The two paths with an abnormal end can be invalidated, leaving 6 valid paths remaining. In the example of a troubleshooting diagnosis process or an insurance claim validation process, the value of each variable is determined one-by-one, and if a path does not meet the conditions of formulas then that path is regarded as an abnormal case such as unresolved case (e.g., unresolved problem diagnosis) or a rejected case (e.g., rejected insurance claim).

The method of FIG. 4 also includes translating (408) the state transition graph into a software application. Translating (408) the state transition graph into a software application may be carried out by generating a software application that determines the values of proposition variables, one-by-one, according to the state transition graph. Determining the values of proposition variables, one-by-one, according to the state transition graph may be carried out by mapping a proposition class to a yes/no question that will be provided in a user interface (UI) to determine a "true" or "false" value for the proposition. Translating (408) the state transition graph into a software application may include parsing the SCXML file by the SCXML execution engine (350), which may be accessed by the UI (360) through UI resource requests to the API on the API server (355) interfaced with the SCXML execution engine (350).

For example, in the use case of a chatbot application, generating a software application that determines the values of proposition variables may include generating a chatbot application that asks a user yes/no questions to determine proposition value; in the use case of automated insurance claim assessment, generating input forms for the automated validation of an insurance claim. It will be recognized by those of skill in the art that the software application may be generated in accordance with the needs of the user and the text document from which the application is created, and is not limited to the example provide in this disclosure.

Figure 5:
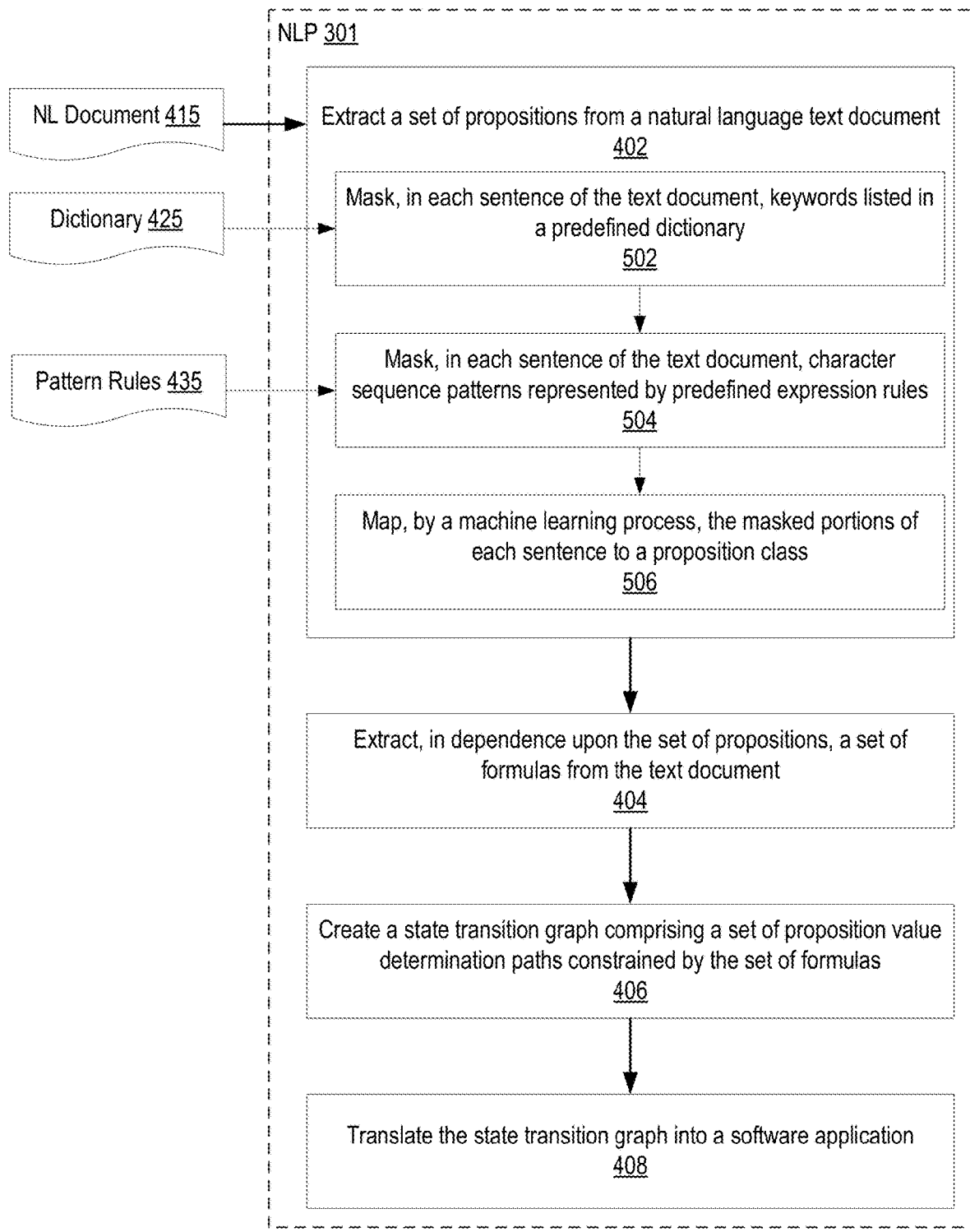
FIG. 5 is a flowchart of an example method for creating an executable process from a text description written in a natural language in accordance with the present invention.

For further explanation, FIG. 5 sets forth a flow chart illustrating an exemplary method creating an executable process from a text description written in a natural language according to embodiments of the present invention that includes extracting (402) a set of propositions from a text document, extracting (404), in dependence upon the set of propositions, a set of formulas from the text document, creating (406) a state transition graph comprising a set of proposition value determination paths constrained by the set of formulas, and translating (408) the state transition graph into a software application.

The method of FIG. 5 differs from the method of FIG. 4, however, in that extracting (402) a set of propositions from a text document includes masking (502), in each sentence of the text document, keywords listed in a predefined dictionary. Masking (502), in each sentence of the text document, keywords listed in a predefined dictionary may be carried out by the keyword tagging module (325) replacing keywords found in the dictionary (425) with abstract tags. Initially, a user prepares a dictionary to markup keywords that have special significance in the document. By the words of "special significance," it is meant that these keywords are key entities composing propositions. The keywords may have normal forms to absorb variant spellings.

In the method of FIG. 5, extracting (402) a set of propositions from a text document further includes masking (504), in each sentence of the text document, character sequence patterns represented by predefined expression rules. Masking (504), in each sentence of the text document, character sequence patterns represented by predefined expression rules. May be carried out by the NLP (301) using pattern rules (435) to identify regular expressions in a sentence of the text document (415). To avoid registering all numbers in dictionary, regular expressions are used to markup age expressions regardless of actual numeric value of age.

For example, where the input to the NLP (126) is a sentence of document, by masking (502), in each sentence of the text document, keywords listed in a predefined dictionary and by masking (504), in each sentence of the text document, character sequence patterns represented by predefined expression rules, the NLP (301) creates a masked sentence and mapping data of the masked part with the surface form and the normal form. For example, where the input is: "Persons whose age is less than eighteen years should have clinical exam," the output is:

"T0 whose age is less than T1 should have T2" where
T0=Persons (person)
T1=eighteen years (18 years)
T2=clinical exam (clinical examination)
Here, the notation T#=surface form (normal form) is used.

In the method of FIG. 5, extracting (402) a set of propositions from a text document further includes mapping (506), via a machine learning process, the masked portions of each sentence to a proposition class. A proposition is represented in a region containing keywords marked up in the example sentence. Mapping (506), via the machine learning process, the masked portions of each sentence to a proposition class may be carried out by the proposition machine learning model (330) using machine learning algorithms to recognize patterns of expressions of propositions and label the proposition with a proposition class. With the keywords already masked, the identified regular expressions are also masked in the sentence. Mapping data of the masked parts with surface and forms, and proposition labels, are also output.

Proposition classes are typically defined by users and are logically generic. For example, the proposition class categories variations of expressions of age in a single class. The proposition class should have a value of true or false and allow the logical operation of inverting true or false. For example, [T0_AGE_LESS_THAN_T1] is true if T0's age is less than T1. The value of [!T0_AGE_LESS_THAN_T1] is true, means T0's age is equal or greater than T1. Here the "!" symbol is used as a logical inversion (NOT) operation. These labels are referred to as proposition variables. For example, where the output of the prior step is input as:

"T0 whose age is less than T1 should have T2", where
T0=Persons (person),
T1=eighteen years (18 years) , T2=clinical exam (clinical examination)
the output is:
"W0 should W1", where
W0="T0 whose age is less than T1", (T0_AGE_LESS_THAN_T1)
W1="have T2" (HAVE_T2)
T0=Persons (person)
T1=eighteen years (18 years)
T2=clinical exam (clinical examination)

Figure 6:
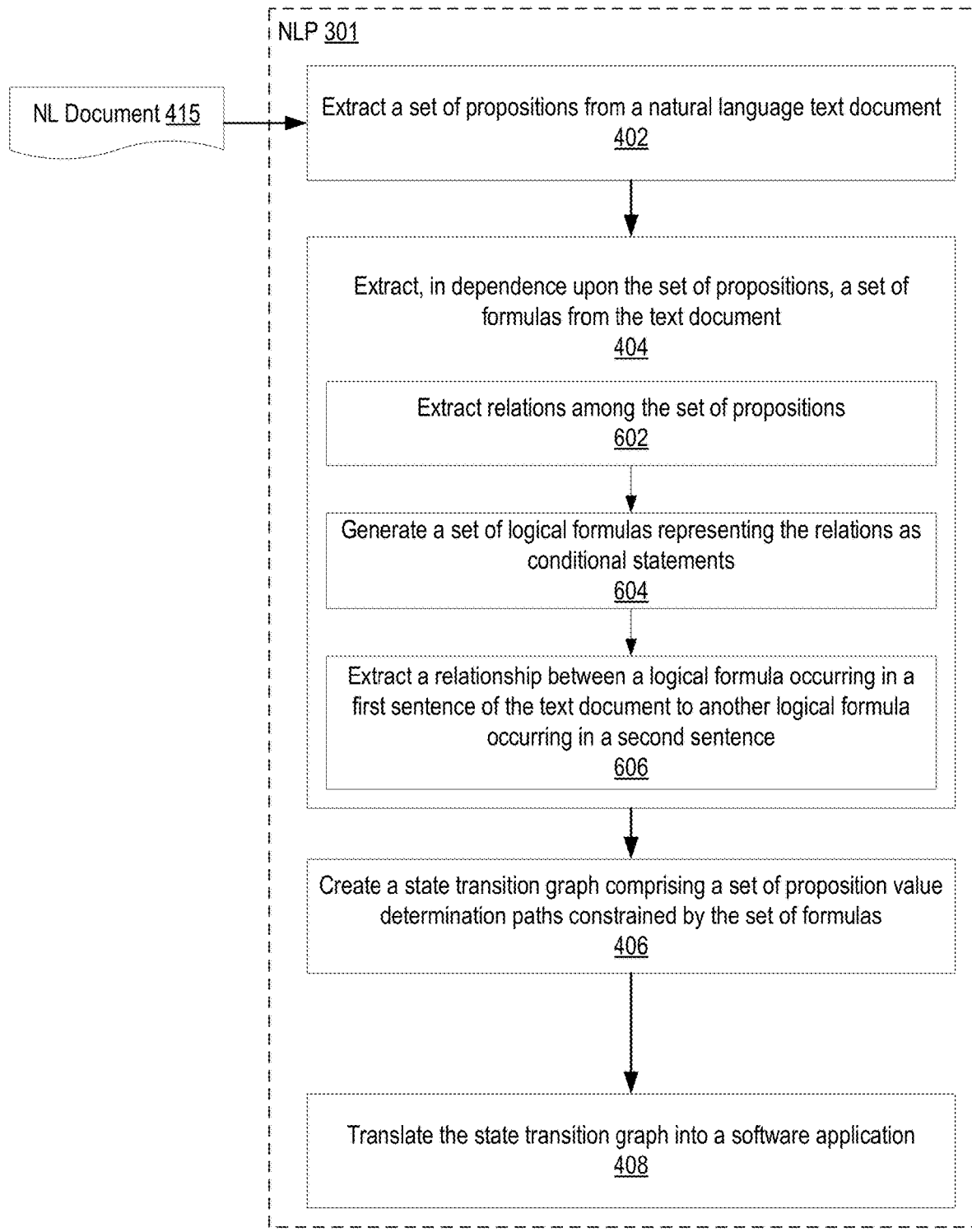
FIG. 6 is a flowchart of an example method for creating an executable process from a text description written in a natural language in accordance with the present invention.

For further explanation, FIG. 6 sets forth a flow chart illustrating an exemplary method creating an executable process from a text description written in a natural language according to embodiments of the present invention that includes extracting (402) a set of propositions from a text document, extracting (404), in dependence upon the set of propositions, a set of formulas from the text document, creating (406) a state transition graph comprising a set of proposition value determination paths constrained by the set of formulas, and translating (408) the state transition graph into a software application.

The method of FIG. 6 differs from the method of FIG. 4, however, in that extracting (404), in dependence upon the set of propositions, a set of formulas from the text document includes extracting (602), via a machine learning process, relations among the set of propositions. Formulas are represented conditional statements among propositions. Extracting (602), via the machine learning process, relations among the set of propositions may be carried out by the formula machine learning model (335) using machine learning to identify relationships among the extracted propositions and entities in the propositions.

In the method of FIG. 6, extracting (404), in dependence upon the set of propositions, a set of formulas from the text document further includes generating (604) a set of logical formulas representing the relations as conditional statements. Generating (604) a set of logical formulas representing the relations as conditional statements outputs a logical formula that can be implemented by an executable process. A logical formula comprises proposition variables and logical operators AND ("&"), OR ("|"), NOT ("!") and a conditional statement symbol ("->"). A conditional statement is written as "A->B" where A and B are proposition variables and a formula A->B constrains possible combinations of proposition variable values as "if A is true, B should be true."

For example, consider proposition variables W0 and W1 in the masked sentence "W0 should W1" where mapping data includes:
 W0="T0 whose age is less than T1" (T0_AGE_LESS_THAN_T1)
 W1="have T2" (HAVE_T2)
 T0=Persons (person)
 T1=eighteen years (18 years)
 T2=clinical exam (clinical examination)

The output of generating (604) a set of logical formulas representing the relations as conditional statements is the logical formula:
 "W0->W1", where mapping data includes:
 W0="T0 whose age is less than T1" (T0_AGE_LESS_THAN_T1)
 W1="have T2" (HAVE_T2)
 T0=Persons (person)
 T1=eighteen years (18 years)
 T2=clinical exam (clinical examination)

By processing multiple sentences in the text document (415) one-by-one, a set of formulas is obtained.

In some embodiments, the method of FIG. 6 further includes extracting (606) a relationship between a logical formula occurring in a first sentence of the text document to another logical formula occurring in a second sentence of the text document. In some situations, there may be a need to identify relationships between proposition variables in different formulas in the set of formulas occurring in different sentences of the text document (415). For example, there may be a need to handle pronouns or relative pronouns, or a need to handle incomplete statements that may be completed by referring to supplemental statement in another sentence. These two are the same in the sense that one sentence does not create a complete formula, but a complete formula can be composed with combination of multiple sentences. Extracting (606) a relationship between a logical formula occurring in a first sentence of the text document to another logical formula occurring in a second sentence of the text document may be carried out by marking supplemental representations that refer another sentence. For example, a PREVIOUS tag can be used to identify a reference to the same proposition variable in a previous sentence, and, at detection of this tag, it can be assumed that that an incomplete formula can be completed by referring backward.

For example, consider the following two sentences occurring separately:
 1: "W0 must have undergone W1."
 2: "The W1 must have taken place in W3."
In this case, two formulas are extracted:
 1: W0->W1
 2: PREVIOUS_THE_W1->W2

However, creating a formula only from statement 1 is insufficient because statement 2 needs to be considered as well. Accordingly, the following two formulas are generated by extracting (606) a relationship between a logical formula occurring in a first sentence of the text document to another logical formula occurring in a second sentence of the text document:
 W0->W1
 W0 &W1->W2

As another example, consider the two sentences:
 1: "W0 when W1"
 2: "This restriction is not applied to W2"
The following formulas are extracted:
 1: W1->W0
 2: W2->PREVIOUS_VOID_FORMULA In view of the relationship identified between statement 1 and statement 2, the following formula is generated by extracting (606) a relationship between a logical formula occurring in a first sentence of the text document to another logical formula occurring in a second sentence of the text document:
 !W2&W1->W0

Figure 7:
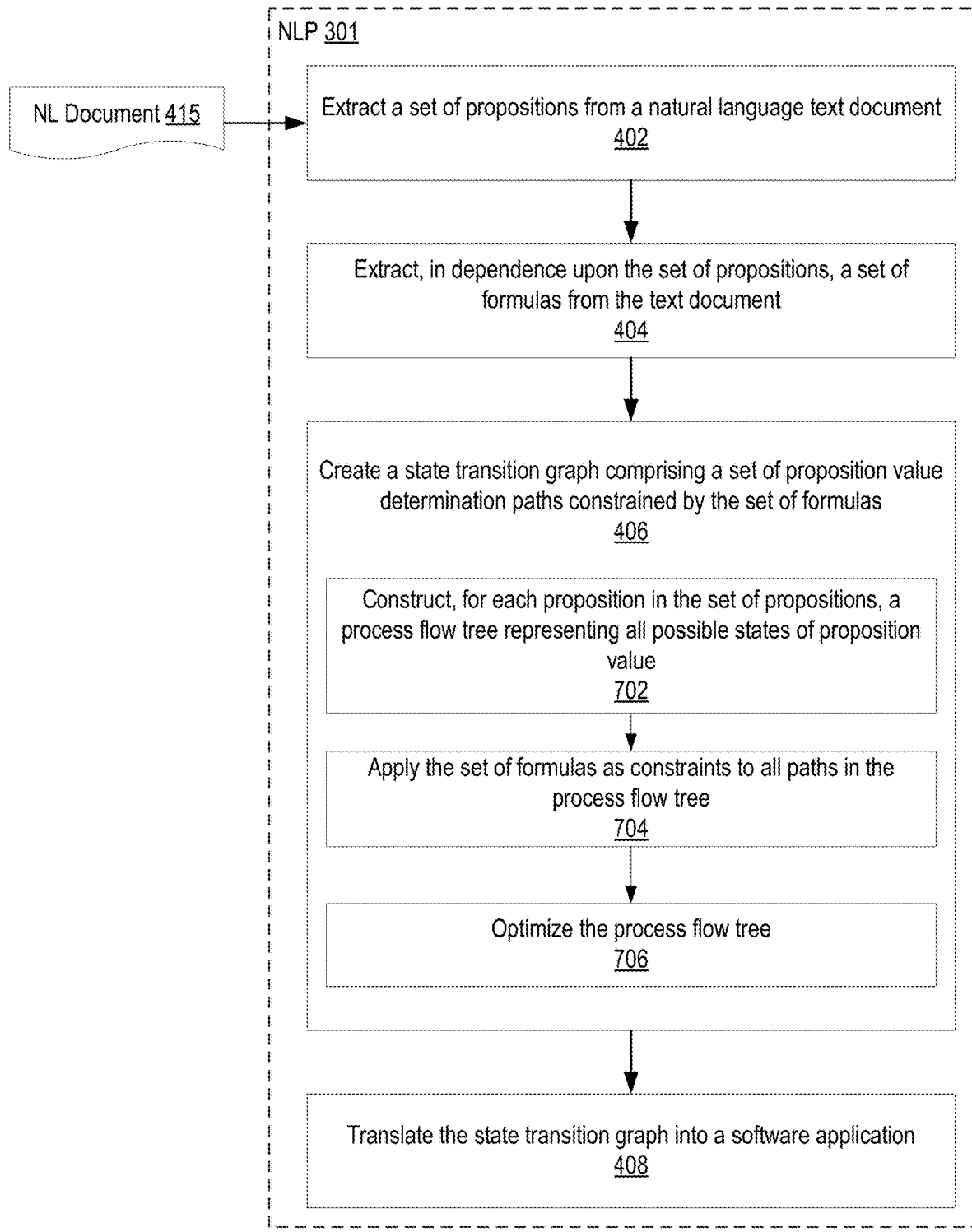
FIG. 7 is a flowchart of an example method for creating an executable process from a text description written in a natural language in accordance with the present invention.

For further explanation, FIG. 7 sets forth a flow chart illustrating an exemplary method creating an executable process from a text description written in a natural language according to embodiments of the present invention that includes extracting (402) a set of propositions from a text document, extracting (404), in dependence upon the set of propositions, a set of formulas from the text document, creating (406) a state transition graph comprising a set of proposition value determination paths constrained by the set of formulas, and translating (408) the state transition graph into a software application.

The method of FIG. 7 differs from the method of FIG. 4, however, in that creating (406) a state transition graph comprising a set of proposition value determination paths constrained by the set of formulas includes constructing (702), for each proposition in the set of propositions, a process flow tree representing all possible states a proposition value. From the set of proposition variables, a tree flow is constructed by creating a start node and selecting a first variable and create two nodes representing true and false values of the variable. These nodes are connected to the start node. Two paths to two new nodes are dynamically selected by user input or form input by determining the value of the variable as either true or false. As an N+1-th step, for every node created by N-th step, associate two new nodes according to true or false value of the N-th variable. By that, N+1 step generates $2^{(N+1)}$ new nodes by attaching two new nodes to $2^N$ nodes generated in N-th step. This process is repeated until N reaches number of proposition variables. Next, all edge nodes ($2^M$ edge nodes are generated where M is number of variables) are connected to a final node which represents normal completion of the process.

With these steps, a tree diagram expanding by order of $2^M$ is created and all nodes on the edge of expansion are connected to an end node. Using the example above, the following graph is obtained:
1. Start->(0)->(0,0)->(0,0,0)->Normal end
2. Start->(0)->(0,0)->(0,0,1)->Normal end
3. Start->(0)->(0,1)->(0,1,0)->Normal end
4. Start->(0)->(0,1)->(0,1,1)->Normal end
5. Start->(1)->(1,0)->(1,0,0)->Normal end
6. Start->(1)->(1,0)->(1,0,1)->Normal end
7. Start->(1)->(1,1)->(1,1,0)->Normal end
8. Start->(1)->(1,1)->(1,1,1)->Normal end In the method of FIG. 7, creating (406) a state transition graph comprising a set of proposition value determination paths constrained by the set of formulas further includes applying (704) the set of formulas as constraints to all paths in the process flow tree. Applying (704) the set of formulas as constraints to all paths in the process flow tree may be carried out by eliminating invalid paths that do not meet the conditions of the formulas. Every formula declares a constraint on variable values. Among variable value state transition paths constructed above, the paths that do not meet the conditions should be ruled out. Applying (704) the set of formulas as constraints to all paths in the process flow tree may be carried out by representing all paths from the start node to the end nodes by the value of each variable and excluding paths that contains invalid transitions. Using the example above with the formula "W2->W0", the 2nd and 4th paths with (0,x,1) should be ruled-out (where the value of W1 is irrelevant to the outcome and is thus represented by "x"). When paths are ruled out, an abnormal end node is created and the transition flow is connected to the abnormal end node. Now, the flow diagram has two end nodes: normal end and abnormal end. The abnormal end node represents as unresolved case (e.g., unresolved problem diagnosis in a chatbot application) or a rejected case (e.g., rejected insurance claim in an automated claim validation application). Thus, the process flow tree is updated to:

1. Start->(0)->(0,0)->(0,0,0)->Normal end
2. Start->(0)->(0,0)->(0,0,1)->Abnormal end
3. Start->(0)->(0,1)->(0,1,0)->Normal end
4. Start->(0)->(0,1)->(0,1,1)->Abnormal end
5. Start->(1)->(1,0)->(1,0,0)->Normal end
6. Start->(1)->(1,0)->(1,0,1)->Normal end
7. Start->(1)->(1,1)->(1,1,0)->Normal end
8. Start->(1)->(1,1)->(1,1,1)->Normal end In the method of FIG. 7, creating (406) a state transition graph comprising a set of proposition value determination paths constrained by the set of formulas further includes optimizing (706) the process flow tree. Optimizing (706) the process flow tree may be carried out by determining combinations of variable values that result in either the normal end or abnormal end, and, if values of a variable on a path do not affect to the end result, that path is truncated to omit the unnecessary determination of variable values. For example, among all paths above:
Among all paths above, only three paths are required as below.

1'. Start->(0)->(0,x,0)->Normal end
2'. Start->(0)->(0,x,1)->Abnormal end
8'. Start->(1)->Normal end That is, when W0 is false and W2 is false, the constraints of the formulas are satisfied regardless of the value of W1. Thus, paths 1 and 3 can be reduced to one path (path 1'). When W0is false and W2 is true, the constraints of the formulas are never satisfied regardless of the value of W1. Thus, paths 2 and 4 can be reduced to one path (path 2'). When W0 is true, the constraints of the formulas can be satisfied regardless of the values of W1 and W2. Thus, paths 5-8 can be reduced to one path (path 8'). This process flow tree is output as a state transition graph.

Figure 8:
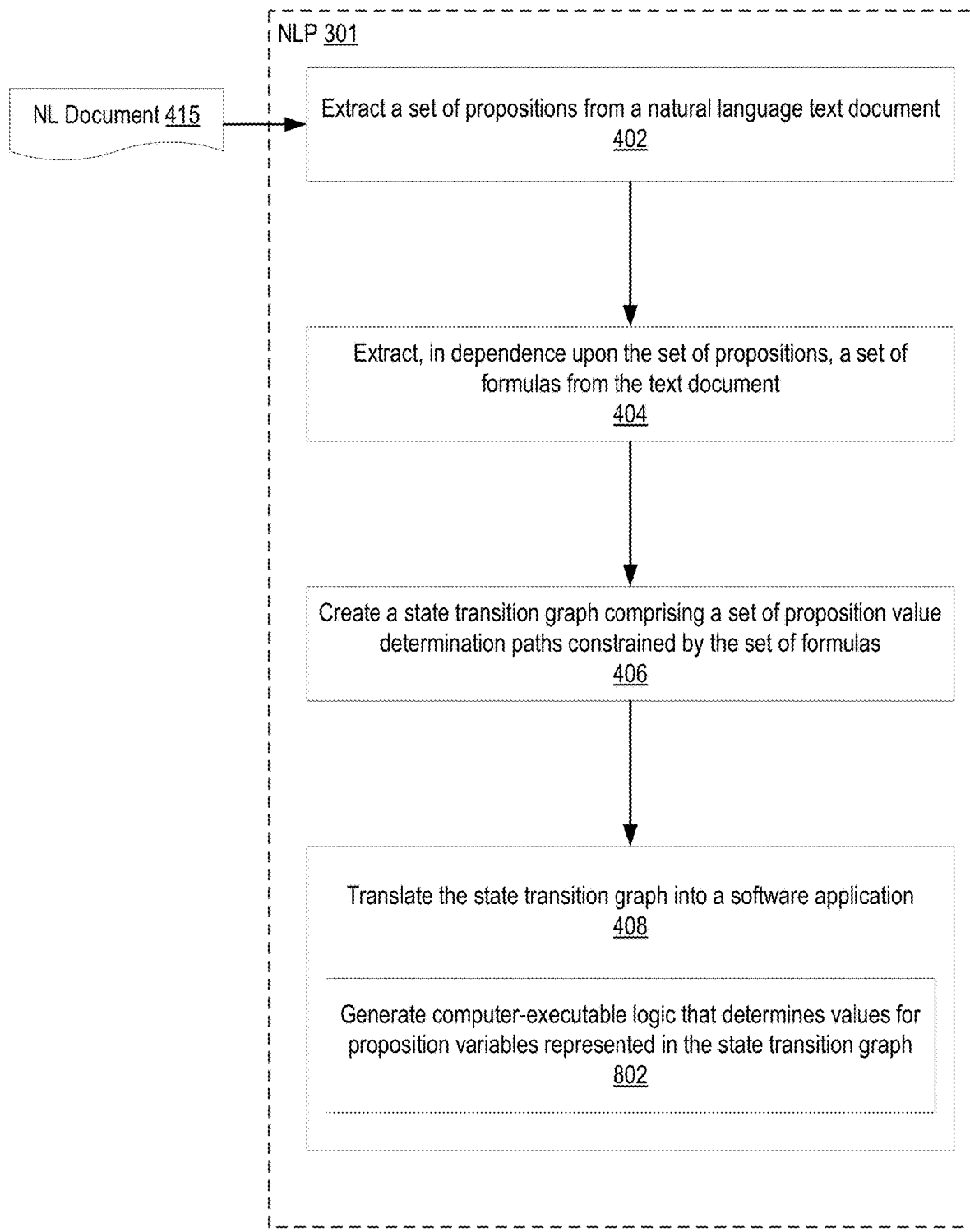
FIG. 8 is a flowchart of an example method for creating an executable process from a text description written in a natural language in accordance with the present invention.

For further explanation, FIG. 8 sets forth a flow chart illustrating an exemplary method creating an executable process from a text description written in a natural language according to embodiments of the present invention that includes extracting (402) a set of propositions from a text document, extracting (404), in dependence upon the set of propositions, a set of formulas from the text document, creating (406) a state transition graph comprising a set of proposition value determination paths constrained by the set of formulas, and translating (408) the state transition graph into a software application.

The method of FIG. 8 differs from the method of FIG. 4, however, in that translating (408) the state transition graph into a software application comprises generating (802) computer-executable logic that determines values for proposition variables represented in the state transition graph. Generating (802) computer-executable logic that determines values for proposition variables represented may be carried out by translating the state transition graph into computer-executable format such as, for example, State Chart XML (SCXML) State Machine Notation for Control Abstraction. The executable process starts from the start node. To transition to a next node, a value of the proposition represented by an edge connecting the current node to another node must be determined. In the use case of a chatbot, for example, this may be carried out by the chatbot asking a question relevant to that proposition. Each question can be generated by using predefined question template with questions that correspond every proposition class. An example of a question template corresponding proposition classes is shown in Table 1.

TABLE 1

| Proposition Class | Question Template |
| --- | --- |
| T0_AGE_ON_T1_LT_T2 | "Is age of "+T0+" less than "+T2+" on "+T1+"?" |
| BEFORE_T0_WITHIN_T1 | "Is it within "+T1+" prior to "+T0+"?" |
| AFTER_T0_WITHIN_T1 | "Is it within "+T1+" after "+T0+"?" |

The proposition class, such as T0_AGE_LESS_THAN_T1, becomes a proposition after substituting the T#'s with actual values. The proposition machine learning model and formula machine learning model discussed above are trained to label part of sentence by these proposition class labels. They become propositions by replacing abstract tags T# by actual values from the mapped data. For example, the example extracted proposition discussed above is:

W0="T0 whose age is less than T1" (T0_AGE_LESS_THAN_T1), where:
T0=Persons (person)
T1=eighteen years (18 years)

The actual proposition is "person_AGE_LESS_THAN_18 years". Therefore, an exemplary question template for this proposition template may be "Is age of T0 less than T1?" The actual question may appear in the generated software application may pose the question to a user "Is age of person less than 18 years?" Thus, the created software application uses an executable state transition graph to traverse a path constrained by formulas and determined by values of proposition variables, which are obtained as yes/no answers to questions posed to a user in a user interface.

In another use case of insurance claim validation, a claim form input or database is read to determine value of the proposition. In this case, actual values of abstract tags T# can be used to create a SQL query against a database or read request of the input form, e.g., represented in Javascript Object Notation (JSON) format.

In view of the explanations set forth above, readers will recognize that the benefits of creating an executable process from a text description written in a natural language according to embodiments of the present invention include:

by taking advantage of machine learning and NLP technologies, the present invention understands written natural languages, by the way of recognizing the context structures with logical inference, as a human does;

text documents written in a natural language can be converted by a natural language processor into an executable process with little supervision by a human;

text documents written in a natural language can be converted to executable logic directly without the need for a human to first converting the natural language description into a programming language; and because text documents written in a natural language that govern business practices, operation manuals, and the like already exist, executable processes that implement these procedures can be created directly from these documents.

Exemplary embodiments of the present invention are described largely in the context of a fully functional computer system for creating an executable process from a text description written in a natural language. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of creating an executable process from a text description written in a natural language, the method comprising:
    extracting a set of propositions from a text document written in a natural language;
    extracting, in dependence upon the set of propositions, a set of formulas from the text document;
    creating a state transition graph comprising a set of proposition value determination paths constrained by the set of formulas, wherein the state transition graph represents potential transitions between states; and
    translating the state transition graph into a software application, including generating the software application.

2. The method of claim 1, wherein extracting a set of propositions from the text document comprises:
    masking, in each sentence of the text document, keywords listed in a predefined dictionary;
    masking, in each sentence of the text document, character sequence patterns represented by predefined expression rules; and
    mapping, by a machine learning process, the masked portions of each sentence to a proposition class.

3. The method of claim 1, wherein extracting, in dependence upon the set of propositions, a set of formulas from the text document comprises:
    extracting, by a machine learning process, relations among the set of propositions; and
    generating a set of logical formulas representing the relations as conditional statements.

4. The method of claim 3, further comprising extracting a relationship between a logical formula occurring in a first sentence of the text document to another logical formula occurring in a second sentence of the text document.

5. The method of claim 1, wherein creating a state transition graph comprising a set of proposition value determination paths constrained by the set of formulas comprises:
    constructing, for each proposition in the set of propositions, a process flow tree representing all possible states a proposition value;
    applying the set of formulas as constraints to all paths in the process flow tree; and
    optimizing the process flow tree.

6. The method of claim 1, wherein translating the state transition graph into a software application comprises generating computer-executable logic that determines values for proposition variables represented in the state transition graph, and wherein the state transition graph is in State Chart XML (SCXML) format.

7. The method of claim 6, wherein the software application generates, based on the state transition graph, questions to be provided in a user interface to determine a Boolean value for each of the proposition variables represented in the state transition graph.

8. An apparatus for creating an executable process from a text description written in a natural language, the apparatus comprising a computer processor, a computer memory operatively coupled to the computer processor, the computer memory having disposed within it computer program instructions that, when executed by the computer processor, cause the apparatus to carry out the steps of:
    extracting a set of propositions from a text document written in a natural language;
    extracting, in dependence upon the set of propositions, a set of formulas from the text document;
    creating a state transition graph comprising a set of proposition value determination paths constrained by the set of formulas, wherein the state transition graph represents potential transitions between states; and
    translating the state transition graph into a software application, including generating the software application.

9. The apparatus of claim 8, wherein extracting a set of propositions from the text document comprises:
    masking, in each sentence of the text document, keywords listed in a predefined dictionary;
    masking, in each sentence of the text document, character sequence patterns represented by predefined expression rules; and
    mapping, by a machine learning process, the masked portions of each sentence to a proposition class.

10. The apparatus of claim 8, wherein extracting, in dependence upon the set of propositions, a set of formulas from the text document comprises:
    extracting, by a machine learning process, relations among the set of propositions; and
    generating a set of logical formulas representing the relations as conditional statements.

11. The apparatus of claim 10, further comprising extracting a relationship between a logical formula occurring in a first sentence of the text document to another logical formula occurring in a second sentence of the text document.

12. The apparatus of claim 8, wherein creating a state transition graph comprising a set of proposition value determination paths constrained by the set of formulas comprises:
   constructing, for each proposition in the set of propositions, a process flow tree representing all possible states a proposition value;
   applying the set of formulas as constraints to all paths in the process flow tree; and
   optimizing the process flow tree.

13. The apparatus of claim 8, wherein translating the state transition graph into a software application comprises generating computer-executable logic that determines values for proposition variables represented in the state transition graph.

14. The apparatus of claim 8, further comprising the step of receiving a predefined dictionary of significant keywords, a proposition class definition, and a formula class definition.

15. A computer program product for creating an executable process from a text description written in a natural language, the computer program product disposed upon a computer readable medium, the computer program product comprising computer program instructions that, when executed, cause a computer to carry out the steps of:
   extracting a set of propositions from a text document written in a natural language;
   extracting, in dependence upon the set of propositions, a set of formulas from the text document;
   creating a state transition graph comprising a set of proposition value determination paths constrained by the set of formulas, wherein the state transition graph represents potential transitions between states; and
   translating the state transition graph into a software application, including generating the software application.

16. The computer program product of claim 15, wherein extracting a set of propositions from the text document comprises:
   masking, in each sentence of the text document, keywords listed in a predefined dictionary;
   masking, in each sentence of the text document, character sequence patterns represented by predefined expression rules; and
   mapping, by a machine learning process, the masked portions of each sentence to a proposition class.

17. The computer program product of claim 15, wherein extracting, in dependence upon the set of propositions, a set of formulas from the text document comprises:
   extracting, by a machine learning process, relations among the set of propositions; and
   generating a set of logical formulas representing the relations as conditional statements.

18. The computer program product of claim 17, further comprising extracting a relationship between a logical formula occurring in a first sentence of the text document to another logical formula occurring in a second sentence of the text document.

19. The computer program product of claim 15, wherein creating a state transition graph comprising a set of proposition value determination paths constrained by the set of formulas comprises:
   constructing, for each proposition in the set of propositions, a process flow tree representing all possible states a proposition value;
   applying the set of formulas as constraints to all paths in the process flow tree; and
   optimizing the process flow tree.

20. The computer program product of claim 15, wherein translating the state transition graph into a software application comprises generating computer-executable logic that determines values for proposition variables represented in the state transition graph.

* * * * *